July 9, 1935.  R. R. STITT  2,007,482
LUBRICANT DISTRIBUTOR
Original Filed March 26, 1930
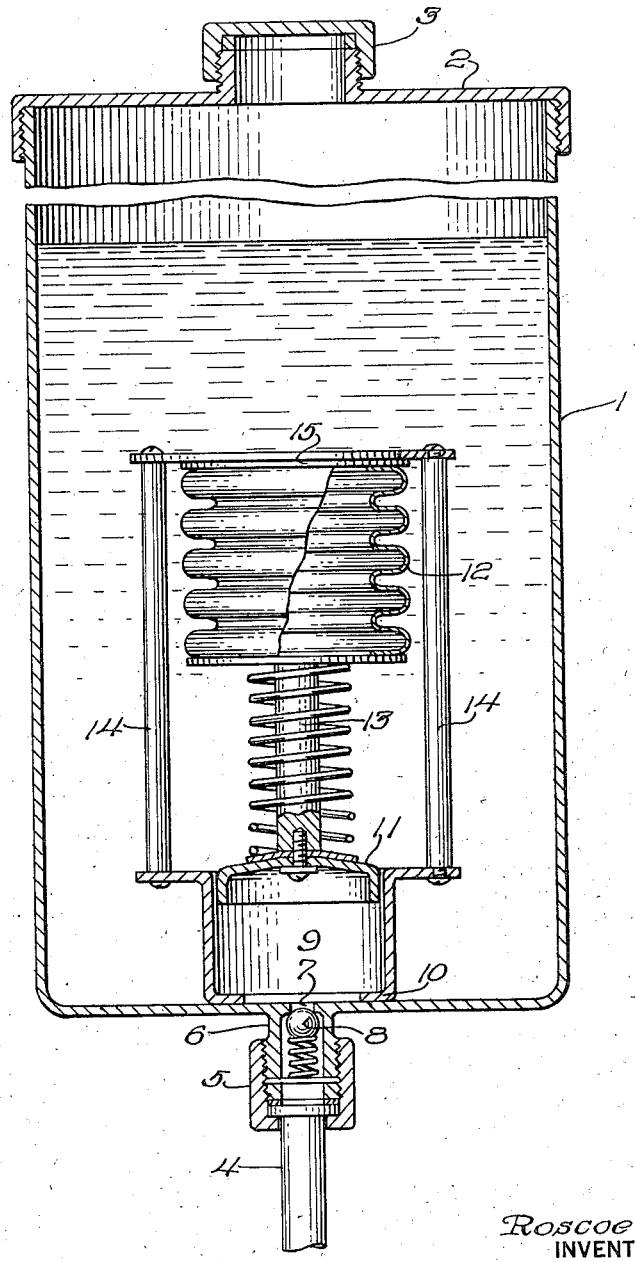
Roscoe R. Stitt
INVENTOR
By Barnes + Kisselle
ATTORNEY Patented July 9, 1935

2,007,482

UNITED STATES PATENT OFFICE 2,007,482

LUBRICANT DISTRIBUTOR

Roscoe R. Stitt, Detroit, Mich.

Application March 26, 1930, Serial No. 438,963
Renewed November 28, 1934

6 Claims. (Cl. 184—26)

This invention relates to a lubricant distributor, and has to do particularly with a simple compact unit for automatically distributing lubricant to predetermined remote points of an automobile.

Chassis lubrication of automobiles from a centralized point has heretofore been commercially accomplished by a suitable hand operated plunger structure which system has usually been termed "one shot" lubrication.

It is the object of the present invention to provide means automatically actuated by the operation of the engine of the automobile for positively lubricating a plurality of points. A further feature of the invention resides in the method of lubrication in that lubricant is forced very slowly to the various points and parts to be lubricated whereby fairly equal distribution and lubrication is obtained irrespective of any relative clearance that might result from wear or improper fitting of some of the parts.

A further feature of the invention contemplates a novel arrangement of parts of the lubricant distributing mechanism whereby it is positively actuated by the heat of the engine. In this case the direct result is that at least one shot will be distributed to all of the parts controlled by the centralized distributor each time that the motor is operated. A still further feature resides in the arrangement of parts wherein additional shots of lubricant will be given as the motor cools down and then heats up again, the quantity of lubricant distributed depending in each case upon the amount of cooling down and heating up.

Other important features involve details of construction as will be more clearly brought out in the specification and claims.

In the drawing I have shown a vertical sectional view of a lubricant distributing unit embodying the features of the present invention and illustrating in particular the thermostatically controlled bellows arrangement for controlling the forcing of lubricant from the unit.

In its preferred form my lubricant distributor and container is formed as one unit and may be mounted at substantially any point in the automobile or similar motor vehicle where it will be affected by a variation in temperature such as that caused by heating up of the motor. It will therefore be obvious that any position underneath the hood of the automobile will be suitable for carrying out the operation of the lubricant distributor or it is conceivable that it might be positioned at any point adjacent the exhaust pipe.

In the embodiment illustrated in the drawing the main container for receiving lubricant is shown as at 1 and may be provided with suitable closure members 2 and 3 for refilling as desired. A main conduit 4 for conducting the lubricant to the various branch conduits for lubricating the various parts of the chassis may be secured to the container 1 by means of suitable union structure 5 cooperating with a suitable projection or nipple 6, formed on the container. This projection 6 is also so formed as to provide a suitable seat 7 for receiving a suitable spring pressed ball 8 so that in effect the nipple 6 also forms a common check valve.

A reservoir or well 9 is positioned just above the nipple 6 and as shown consists of a stamped cup like member which may be welded or otherwise secured to the base of the container as at 10. A plunger 11 which preferably is in the form of an inverted flexible cup portion is adapted to be reciprocated within the reservoir 9 and in the preferred arrangement there is enough clearance between the plunger 11 and the walls of the reservoir 9 to permit the lubricant to flow into the reservoir 9 when the plunger is stationary. It will be understood that various other arrangements may be used for supplying lubricant to this reservoir 9 but the simple flexible washer providing slight clearance has been utilized so as to reduce the expense and number of parts of the unit.

The plunger or piston 11 is shown as being connected to a bellows member 12 by means of a suitable piston rod 13. It will be obvious however, that the same result may be obtained by directly connecting the plunger or piston 11 to the bellows member. This bellows member may be held in position in any suitable manner and in the drawing I have shown suitable standards 14 carried by the reservoir 9 and directly supporting the bellows member as by means of a top plate 15. The bellows member is preferably filled with ethyl chloride, ether, or other similar gas so that at 32° F. the bellows member will preferably be in its zero retracted position.

In operation, the container 1 being filled with a lubricant it will be obvious from the arrangements of parts as shown in the drawing that a portion of this lubricant will fill up the reservoir 9. As the entire unit is preferably positioned adjacent some part of the vehicle which becomes heated during operation of the motor it will be obvious that the entire unit will be gradually heated with the result that the gas within the bellows member will cause the bellows to expand. The flexible washer member 11 will then be forced downwardly so as to gradually and positively force the lubricant from the reservoir 9, through the check valve, and into the main conduit 4 to be distributed to the various points as desired. The degree and extent of expansion of the bellows member will, of course, vary greatly with the conditions of starting and operation of the motor, but regardless of the rapidity of heating up of the motor or the extent to which it is heated up, it will be obvious that the bellows member will be given a positive relatively slow action so as to force the lubricant slowly to all parts of the lubricant system.

During the upstroke of the piston rod 13, the slight clearance between the flexible flange of the plunger 11 and the walls of the reservoir 9, combined with the pressure differential on opposite sides of the piston, will permit the oil to rapidly fill the container 9. On the down stroke, the flexible flange of the cup shaped plunger 11 will snugly fit the walls of the container, mainly due to the pressure developed in the container.

Thus without any attention whatsoever from the operator it will be obvious that the operation of the engine for even a very short time will result in the positive lubricating of the parts of an automobile which are connected with the centralized lubricator. It will also be obvious that it is more than a "one shot" unit because under average conditions the automobile stops one or more times during even a short trip thus allowing the motor to cool down slightly or entirely. This will allow the piston to be retracted by retraction of the bellows with the result that the reservoir will again be more or less filled and a second charge of lubricant forced to the various parts of the engine to be lubricated as the motor is again heated up. In addition to this positive automatic lubrication it is also important that the lubricant is forced slowly but positively to the parts to be lubricated. In actual practice it usually takes from ten to thirty minutes to complete the forcing of the lubricant in one charge. As the lubricant is not forced through the conduits in a single quick shot, as is the usual practice, it will be obvious that there is much better distribution of lubricant to all parts. It will also be understood that the amount of lubricant dispensed in each case is proportionate to the rise in temperature.

What I claim is:

1. A lubricant distributing device for motor vehicles comprising a centralized lubricant container unit, a well and plunger therefor for forcing lubricant from the container and a bellows member connected to the plunger and containing a gas adapted to be expanded by heat whereby the plunger is actuated and lubricant is forced from the centralized container by a rise in temperature of the motor.

2. A lubricant distributing device of the type having a centralized container unit for forcing lubricant to remote separated points, comprising a well and plunger mechanism, and means connected to said plunger and actuated by the temperature surrounding the unit.

3. A centralized container unit for lubricant distributing systems, comprising means for forcing predetermined amounts of lubricant from the container and a bellows member connected to said means and adapted to be expanded by heat whereby to positively force lubricant from the container when affected by a rise in surrounding temperature.

4. A centralized container for a lubricant distributing system, comprising a main conduit leading therefrom, a check valve separating the conduit from the lubricant within the container, a well for receiving a portion of the lubricant, a plunger for forcing lubricant from the well through the check valve and thermostatically actuated means connected with said plunger for actuating the same to force the lubricant from the well.

5. A lubricant distributing device for motor vehicles of the type having a reservoir, and a conduit for conducting a charge of lubricant to remote points, comprising a thermostatically actuated bellows member positioned within the reservoir adapted to be actuated by the heat from the motor for directly forcing a charge of lubricant from the reservoir through said conduit.

6. A lubricant distributing system comprising a centralized container unit for holding a supply of lubricant, a cylinder immersed in said lubricant, a plunger bodily movable in said cylinder for displacing and directly forcing a portion of the lubricant from the centralized unit, and thermostatically actuated means in said container connected with said plunger for actuating the same to force lubricant from the unit.

ROSCOE R. STITT.